Patented Jan. 31, 1939

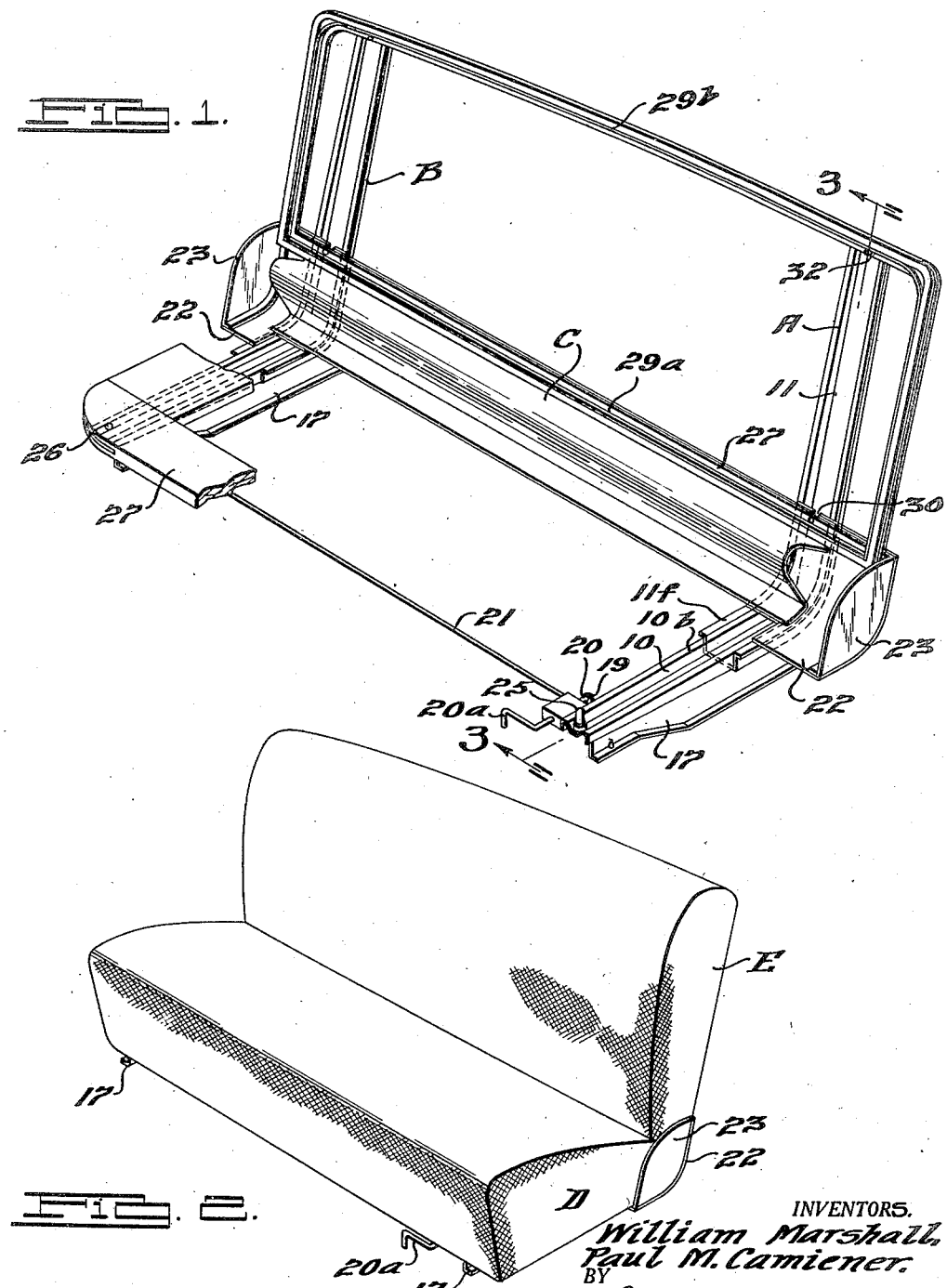

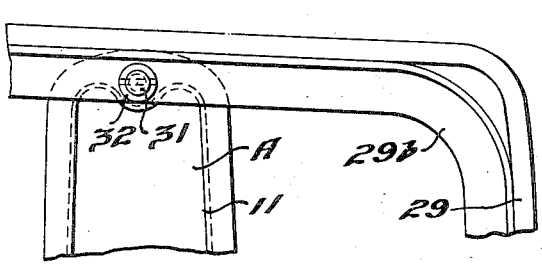
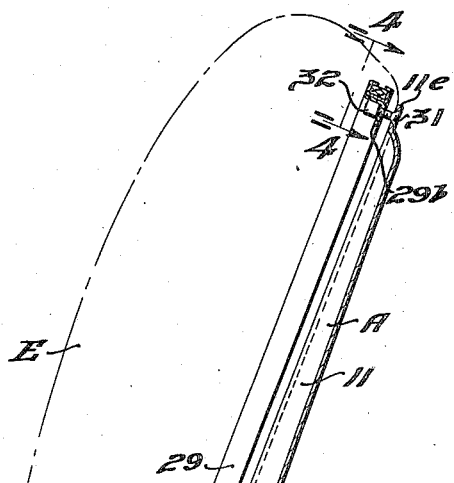
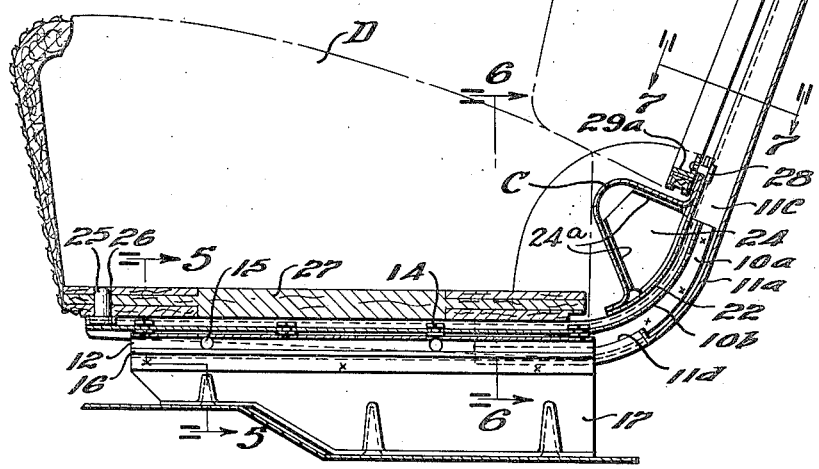
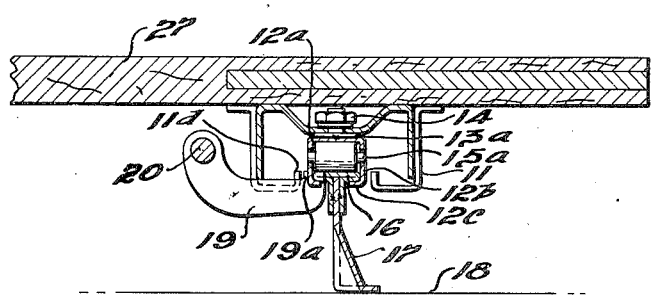

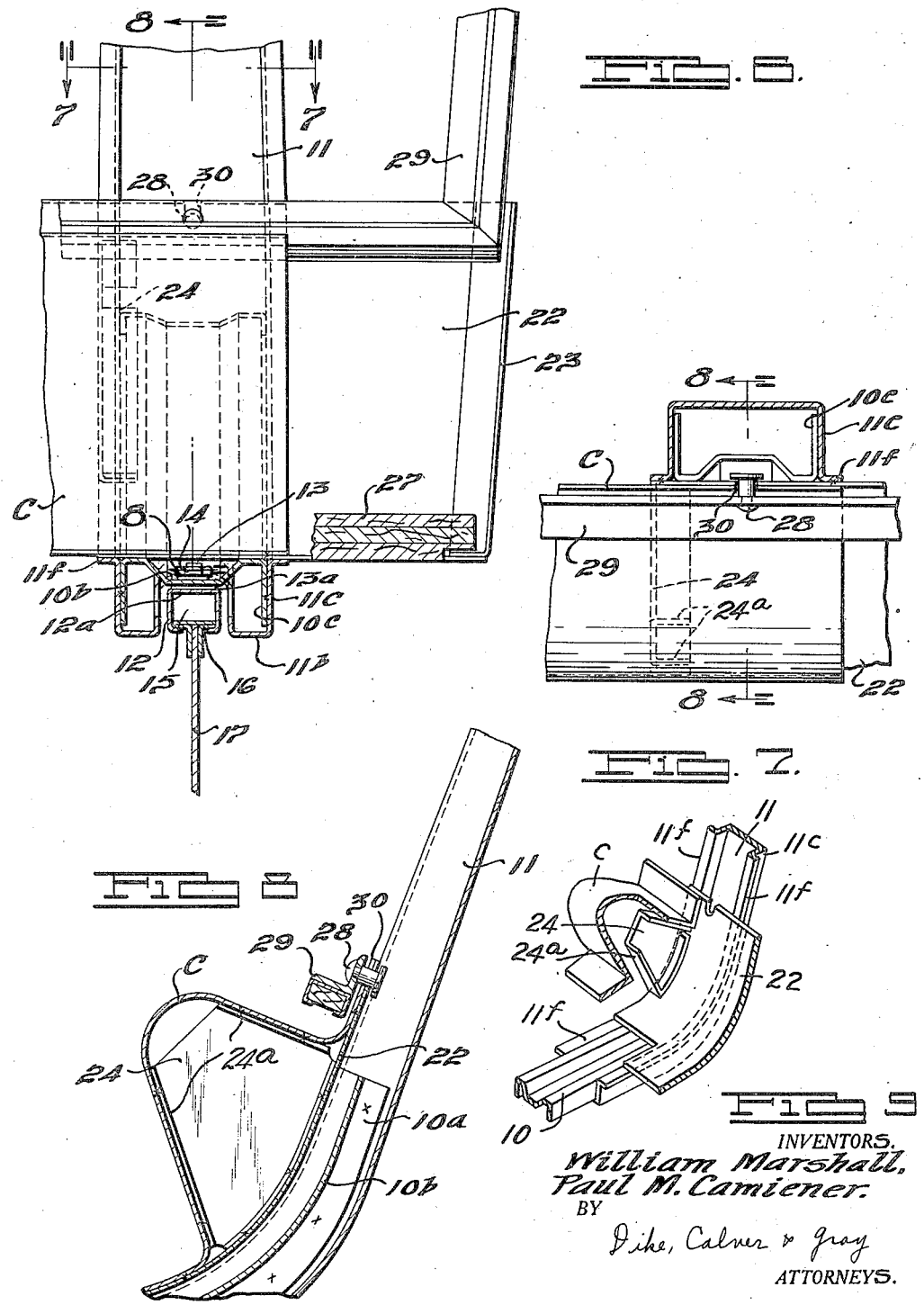

2,145,660

UNITED STATES PATENT OFFICE 2,145,660

SEAT CONSTRUCTION

William Marshall and Paul M. Camiener, Detroit, Mich., assignors to Briggs Manufacturing Company, Detroit, Mich., a corporation of Michigan Application December 5, 1935, Serial No. 52,960

8 Claims. (Cl. 155—165)

This invention relates to frames for the seats of automobiles or other vehicles and particularly, although not exclusively, to frames for the front seats of automobiles which are adapted to be adjusted backwards and forwards and whose cushions are made separate from and detachable from the frame.

An object of the invention is to provide a combined seat and back frame of simplified, strong and economical construction, composed principally of three structural members, namely, a pair of L-shaped seat and back supporting members and a tie member connecting the L-shaped members together at the locality of the bends thereof, said tie member in turn preferably providing toe room for the occupant in rear of the seat as also a foot rest.

Another object of the invention is to provide a seat frame of the character described in which the main L-shaped members of the frame extend continuously from the front to the rear of the seat and thence upward or vertically to provide back supports, thereby being adapted to more efficiently transmit forces on the back of the seat to the seat support.

Another object of this invention is to provide a seat frame in which the main strength members are considerably stronger at their points of greater stress so that the seat frame will be amply strong at all points and no excess metal will be provided at points of lower stress. A further and more specific object is to form the main strength members of substantially rectangular sections of pressed sheet metal, the extra strength at the points of greatest stress being provided by the overlapping of the sections of metal forming the members. Thus a light structure can be formed economically from pressed sheet metal.

Another object of this invention is to provide a seat frame in which the space below the back cushion and the back of the seat cushion, although open to receive the feet of the passenger in the back seat, is closed at the ends so as to be concealed from the side of the seat, as when the door of the car is open.

Another object of this invention is to provide a seat frame for an adjustable automobile seat which has a minimum of members extending below and parallel to the seat, so that when the seat is adjusted by being moved forward or back, the space below the seat will not be traversed by members moving in any direction except along their own length and will be more suitable for use as a storage space.

Other objects of this invention will appear in the following description and appended claims, reference being had to the accompanying drawings forming a part of this specification wherein like reference characters designate corresponding parts in the several views.

Fig. 1 is a perspective view of the seat frame with the frame of a back cushion and one corner of the base of the seat cushion shown in place, the rest of the cushions having been omitted in order to more clearly show the structure of the seat frame.

Fig. 2 is a perspective view of the seat frame with both cushions in place.

Fig. 3 is a transverse vertical section taken on the line 3—3 of Fig. 1.

Fig. 4 is a view from the line 4—4 of Fig. 3 taken in the direction of the arrows.

Fig. 5 is a section on the line 5—5 of Fig. 3 taken in the direction of the arrows.

Fig. 6 is a section on the line 6—6 in Fig. 3 taken in the direction of the arrows.

Fig. 7 is a section on the line 7—7 of Figs. 3 and 6 taken in the direction of the arrows.

Fig. 8 is a section on the line 8—8 in Figs. 6 and 7 taken in the direction of the arrows.

Fig. 9 is a fragmentary vertical section, in perspective, taken in the vicinity of the line 3—3 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, one embodiment of the invention wherein the seat and back frame is composed of three principal members, namely, a pair of L-shaped strainers A and B and a cross tie member C.

Each of the L-shaped strainers A and B comprises two pressed steel members 10 and 11 telescoped and fitting into each other at the band of the strainer, each member forming one leg of the strainer and extending around the curve a short distance along the other member. The member 10 forming the horizontal or seat leg of the strainer is an inverted pressed sheet metal channel which opens or faces down. The major part of the channel 10 is straight and lies horizontally under the seat cushion D to support it, but the end 10a of the channel curves up in back of the cushion.

The upright leg 11 of the strainer is also a pressed sheet metal channel, but instead of opening or facing back away from the back cushion E, it opens toward it, so that its lower portion 11a, which extends around the bend of the strainer and a short distance under the seat, faces forward and up, instead of facing down and back like the channel forming the seat leg. The end 10a of the seat leg member fits in between the flanges 11c on the back leg member to form a box section, the top of the box being formed by the web 10b of the seat leg channel, the bottom being formed by the web 11b of the back leg channel, and the sides of the box being formed by the flanges 10c and 11c of the two channels, the flanges overlapping and being welded together. This box section occurs around the bend of the strainer which is the point of greatest stress where the greatest strength is needed.

The downwardly facing channel 10 forming the seat leg serves to receive the means by which the seat is movably supported to allow adjustment backwards and forwards. These means comprise an inverted U-shaped channel 12 forming a roller carrier which lies within the seat leg channel 10 and has its top or web 12a bolted to the web 10b of the seat leg channel. The bolts 13 have their heads 13a spot welded to the top 12a of the roller carrier and extend up through holes in the web 10b of the seat leg channel. The ends of the bolts 13 and the nuts 14 on them lie in a longitudinally extending recess or trough in the web 10b of the seat leg channel 10 so that they do not project up above the main portion of the web and interfere with the seat cushion.

The roller carrier 12 serves as a mounting for the rollers 15 whose projecting stub spindles 15a are journalled in holes in the sides 12b of the roller carrier 12. These rollers 15 rest on the flat head 16 of a rail 17 mounted on the floor 18 of the automobile body and enable the seat to be rolled back and forth. The rollers 15 are kept from getting off of the rail 17 by the sides 12b of the roller carrier which extend down below the head of the rail and whose lower edges 12c are turned in to form small flanges extending under the head of the rail.

The strainer can roll forward on the rail 17 without the web 11b of the end of the back leg channel coming in contact with the rail because the web of that part of the channel is slotted, the edges of the web at the sides of the slot being turned up to form flanges 11d in order to maintain the strength of the channel. This slot extends back a short distance up the bend of the strainer, so that the end of the slot is above the head 16 of the rail, allowing the seat to roll forward as far as desired.

Each strainer is locked in adjusted position on the rail by means of an arm 19 mounted on a rock shaft 20 alongside the seat leg 10 of the strainer. The end 19a of the arm can swing into slots in the roller carrier 12 and the edge of the rail head 16, locking the two against relative movement, and is held in locking position by a spring. The end of the shaft on one strainer extends forward to the front edge of the seat and terminates in a handle 20a by means of which it may be operated. The shaft on the other strainer is rocked simultaneously with the first shaft by means of a link 21 which connects the two shafts.

The two strainers are spaced far apart so as to be near the ends of the cushions D and E, and the curved portion of each strainer, extending from a point below the seat cushion D to a point in back of the back cushion E, carries an outwardly extending sheet metal concealing member or plate 22 which rests against and is secured, as by spot welding, to the flanges 11c on the back leg of the strainer and to the web 10b of the seat leg 10. The outer ends of the members 22 carry vertical closure plates or caps 23 which cover and conceal the adjacent corners of the cushions D and E.

The two strainers A and B are joined together by a flanged trough-like tie member C which extends from one strainer to the other and whose ends lie in the curved portions of the strainers where the seat legs 10 join the back legs 11. The trough C faces down and back, and its flanges lie on the concealing members 22 over the flat flanges 11f of the back legs and the webs 10b of the seat legs. The flanges of the tie member C are spot welded through the concealing members 22 to the flat flanges 11f and the web 10b, thus rigidly connecting the strainers together in their proper relative position. The tie member C lies below the back cushion E and in back of the seat cushion D and provides a space opening to the rear into which the feet of the passengers riding in a back seat can project. Thus the room between and in front of the strainers which is not occupied by the seat cushions is made available for the use and comfort of the passengers of the automobile. The tie member C is provided with a transverse diaphragm 24 near each end, the diaphragms being in line with the edge of the flanges 11c on the strainers and having flanges 24a bent towards the ends of the seat and welded to the walls of the tie member C, and to the concealing members 22. These diaphragms reenforce the tie member C and additionally secure it to the strainers besides providing end walls or closures for the space for the feet of passengers in the back seat.

The seat cushion D rests upon the seat legs of the strainers in front of the trough C and is kept from shifting by pins 25 at the front ends of the strainers which project up into holes 26 in the frame 27 of the seat cushion D. The back cushion E includes a rectangular angle iron frame 29 which rests against the upwardly extending back legs 11 of the strainers above the tie piece C. This frame is detachably held in place by headed rivets 28 secured to the lower part 29a of the rectangular angle iron frame 29 of the back cushion, these rivets releasably fitting into notches 30 in the upper edge of the upper flange on the tie member C. The upper section 29b of the back cushion frame carries screw bosses 32 and is detachably secured to the upper ends of the strainers by means of screws 31 which extend through holes in the flanges 11e at the upper ends of the legs 11 and screw into tapped holes in the bosses or lugs 32.

We claim:

1. A vehicle seat frame comprising a pair of transversely spaced substantially L-shaped frame members for supporting seat and back cushions, a transverse tie member connecting said frame members together and being formed with a trough opening rearwardly to provide a foot rest for an occupant in rear of said seat.

2. A vehicle seat frame comprising a pair of transversely spaced substantially L-shaped frame members for supporting seat and back cushions, a transverse tie member connecting said frame members together and being formed with a trough opening rearwardly to provide a foot rest for an occupant in rear of said seat, each of said L-shaped channel members comprising metallic sections telescoped together.

3. A vehicle seat frame comprising a pair of transversely spaced L-shaped frame members for supporting seat and back cushions, a transverse tie member connecting said frame members together and being formed with a trough opening rearwardly to provide a foot rest for an occupant in rear of said seat, each of said L-shaped members comprising channel sections having bent ends telescoped together, one thereof being inverted with relation to the other.

4. A vehicle seat frame comprising a pair of transversely spaced L-shaped frame members for supporting seat and back cushions, a transverse tie member connecting said frame members together and being formed with a trough opening rearwardly to provide a foot rest for an occupant in rear of said seat, and transverse diaphragms supported intermediate the ends of said tie member for closing opposite ends of the trough.

5. A vehicle seat frame comprising a pair of transversely spaced L-shaped frame members for supporting seat and back cushions, a transverse tie member connecting said frame members together and being formed with a trough opening rearwardly to provide a foot rest for an occupant in rear of said seat, transverse diaphragms supported intermediate the ends of said tie member for closing opposite ends of the trough, and metallic caps overlying the junctures of the seat and back cushions and secured to the L-shaped members for concealing the ends of said tie member.

6. A vehicle seat frame comprising a pair of transversely spaced L-shaped strainers for supporting seat and back cushions, each strainer comprising a pair of L-shaped channel members telescoped together at the bend of the strainer, and a transverse tie bar joining said strainers at the locality of their bends.

7. A vehicle seat frame comprising a pair of transversely spaced L-shaped strainers for supporting seat and back cushions, each strainer comprising a pair of L-shaped channel members telescoped together at the bend of the strainer, and a transverse tie bar joining said strainers at the locality of their bends, said bar being trough-shaped to provide a transverse toe receiving recess for a rear seat occupant.

8. A vehicle seat including a frame comprising a pair of transversely spaced L-shaped metal strainers having horizontal and vertical legs, a transverse metallic tie member joining said strainers at the locality of the bends thereof, said strainers each comprising a pair of channel sections telescoped together.

WILLIAM MARSHALL.
PAUL M. CAMIENER.